United States Patent
Strauch

(10) Patent No.: US 11,835,973 B2
(45) Date of Patent: Dec. 5, 2023

(54) FLUID PRESSURE CONTROL APPARATUS

(71) Applicant: Siemens Aktiengesellschaft, Munich (DE)

(72) Inventor: Piotr Strauch, Rülzheim (DE)

(73) Assignee: Siemens Aktiengesellschaft, Munich (DE)

(*) Notice: Subject to any disclaimer, the term of this patent is extended or adjusted under 35 U.S.C. 154(b) by 250 days.

(21) Appl. No.: 17/207,211

(22) Filed: Mar. 19, 2021

(65) Prior Publication Data
US 2021/0294359 A1 Sep. 23, 2021

(30) Foreign Application Priority Data
Mar. 20, 2020 (EP) .................................... 20164731

(51) Int. Cl.
*G05D 16/20* (2006.01)
*F16K 27/12* (2006.01)
*G01L 19/00* (2006.01)

(52) U.S. Cl.
CPC ......... *G05D 16/2022* (2019.01); *F16K 27/12* (2013.01); *G01L 19/0084* (2013.01); *G05D 16/2024* (2019.01)

(58) Field of Classification Search
CPC .......... G05D 16/2022; G05D 16/2024; F16K 27/12; G01N 2035/00306; G01L 19/0084; F17D 3/01; F17D 1/02
See application file for complete search history.

(56) References Cited

U.S. PATENT DOCUMENTS

| | | | | |
|---|---|---|---|---|
| 5,741,960 A | * | 4/1998 | Payne | G01N 1/2035 422/89 |
| 7,506,533 B2 | * | 3/2009 | Bailey | G01N 30/88 95/82 |
| 9,151,731 B2 | * | 10/2015 | Heitz | G01N 33/4925 |
| 9,568,095 B2 | * | 2/2017 | Eglinger | G05D 16/2013 |
| 11,378,555 B2 | * | 7/2022 | Schmidt | G01N 30/62 |
| 2005/0279408 A1 | * | 12/2005 | Henderson | G05D 16/2013 137/487.5 |
| 2007/0074865 A1 | * | 4/2007 | Ichinose | G05D 27/02 165/247 |

(Continued)

FOREIGN PATENT DOCUMENTS

EP 3 627 274 A1 3/2020

*Primary Examiner* — Jessica Cahill
(74) *Attorney, Agent, or Firm* — Henry M. Feiereisen LLC

(57) ABSTRACT

A fluid pressure control apparatus includes a proportional solenoid valve having a solenoid portion and a valve portion operatively connected between a fluid inlet port and a fluid outlet port fluidly coupled to a pressure sensor. An electronic controller receives a first signal from the pressure sensor, receives a second signal corresponding to a pressure set point, and outputs a control signal to the solenoid valve. A flameproof/explosion proof or pressurized/purged enclosure houses the electronic controller and the solenoid portion of the solenoid valve, and a manifold block mounted to the enclosure covers and closes an opening of the enclosure. The manifold block includes internal passageways connecting the valve portion of the solenoid valve between the fluid inlet port and the fluid outlet port. The pressure sensor is arranged outside the enclosure, with the first signal from the pressure sensor being conducted into the enclosure via a fluid-tight electrical feedthrough.

20 Claims, 2 Drawing Sheets

(56) References Cited

U.S. PATENT DOCUMENTS

| | | | |
|---|---|---|---|
| 2015/0027567 A1* | 1/2015 | Shreve | F16K 31/0655 |
| | | | 137/528 |
| 2016/0252912 A1* | 9/2016 | Horwitz | G01F 1/88 |
| | | | 137/2 |
| 2020/0096487 A1 | 3/2020 | Schmidt et al. | |

* cited by examiner

FLUID PRESSURE CONTROL APPARATUS

CROSS-REFERENCES TO RELATED APPLICATIONS

This application claims the priority of European Patent Application, Serial No. 20164731.0, filed Mar. 20, 2020, pursuant to 35 U.S.C. 119(a)-(d), the disclosure of which is incorporated herein by reference in its entirety as if fully set forth herein.

BACKGROUND OF THE INVENTION

The invention relates to a fluid pressure control apparatus.

A fluid pressure control apparatus can be used to provide a regulated fluid pressure output that is equal to a pressure set point value applied to the fluid pressure control apparatus. It may find application in gas analysis equipment, for example, for regulating a carrier gas flow in a process gas chromatograph. Such gas analysis equipment is often located in a harsh environment where explosive gases may be present. Thus, safety precautions must be taken to prevent gases from igniting. For that purpose, one approach involves arrangement of the fluid pressure control apparatus in a pressurized enclosure that uses overpressure to prevent an explosive atmosphere from entering. As an alternative, the enclosure may be designed flameproof/explosion-proof to prevent an explosion occurring inside the enclosure from spreading and igniting the explosive atmosphere surrounding the enclosure.

It would be desirable and advantageous to provide an improved fluid pressure control apparatus to obviate prior art shortcomings.

SUMMARY OF THE INVENTION

According to one aspect of the invention, a fluid pressure control apparatus includes a proportional solenoid valve including a solenoid portion and a valve portion which is operatively connected between a fluid inlet port and a fluid outlet port, a pressure sensor fluidically coupled to the fluid outlet port, an electronic controller configured to receive a first signal from the pressure sensor, to receive a second signal corresponding to a pressure set point, and to generate and output a control signal to the solenoid valve, a flameproof/explosion proof or pressurized/purged enclosure which houses the electronic controller and at least the solenoid portion of the proportional solenoid valve, the enclosure having an opening, and a manifold block mounted to the enclosure so as to cover and close the opening of the enclosure, the manifold block having a front side which faces outside the enclosure and includes the fluid inlet port and the fluid outlet port, the manifold block including internal passageways connecting the valve portion of the solenoid valve between the fluid inlet port and the fluid outlet port, wherein the pressure sensor is arranged outside the enclosure, with the first signal from the pressure sensor being conducted into the enclosure via a fluid-tight electrical feedthrough.

According to another aspect of the invention, a gas chromatograph includes a fluid pressure control apparatus as set forth above.

As the pressure sensor is arranged outside the enclosure and thus is separated from the inner of the enclosure, the number of potential leakage sources inside the enclosure is reduced to no more than the one between the solenoid valve and the manifold block.

According to another advantageous feature of the invention, the valve portion of the solenoid valve can be accommodated in the manifold block. As a result, there is no leakage source inside the enclosure. In this case, the valve portion of the solenoid valve can be actuated by the solenoid portion inside the enclosure through an operational interface at a backside of the manifold block either by mechanical or magnetic force. Alternatively, the valve portion may be housed in the enclosure and permanently joined to the manifold block at a backside thereof that faces inside the enclosure. The permanent joint is understood to be made not flexible or via plugs and sockets but by, e.g., welding or brazing so that the valve portion is an infallible containment system considered not to release flammable or hazardous gas into the electronics housing or enclosure.

The pressure sensor can be arranged outside both the enclosure and the manifold block, e.g., plugged at the front side of the manifold block or located in equipment to which the pressure regulated gas is provided. Alternatively, the pressure sensor can be accommodated in the manifold block. In both cases, the gas-tight electrical feedthrough may be arranged in the manifold block.

When the cable or wire that carries the first signal runs outside the enclosure and the manifold block in a hazardous area where explosive gas or dust might be present, the cable or wire may be surrounded by an enclosure that provides a certain ingress protection level. In order to keep the effort involved to a minimum, the pressure sensor may be connected to the electronic controller through an intrinsic safety barrier inside the enclosure.

According to another advantageous feature of the invention, the manifold block can be configured in one-piece and integrally formed.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
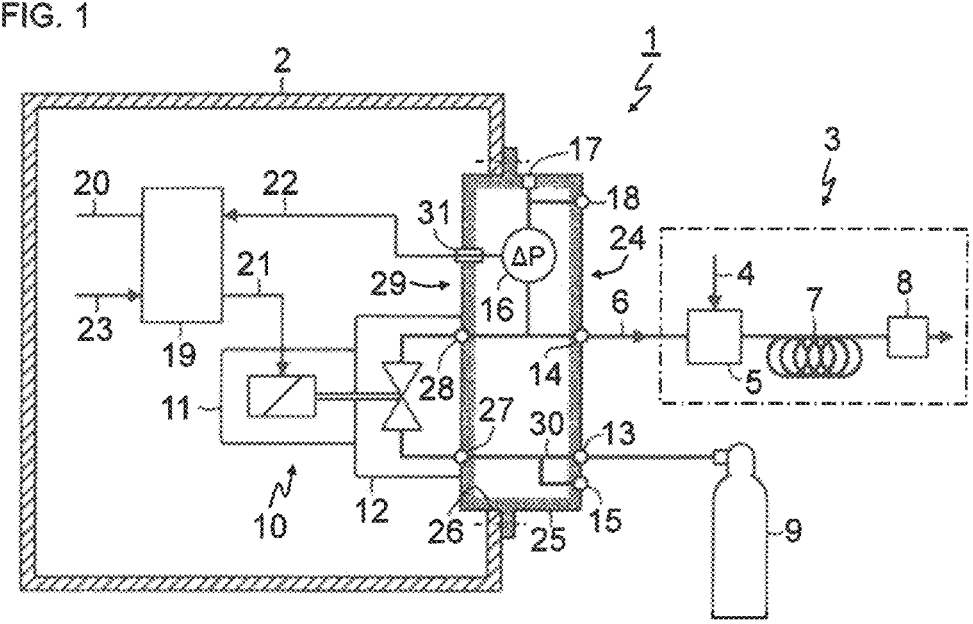
FIG. 1 illustrates a simplified schematic block diagram of a first exemplary embodiment of a fluid pressure control apparatus according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified schematic block diagram of a first exemplary embodiment of a fluid pressure control apparatus according to the invention, generally designated by reference numeral 1. The fluid pressure control apparatus 1 is partially arranged in an electronics housing or enclosure 2 of, e.g., a process gas chromatograph 3 for analyzing a sample 4. The sample 4 is supplied to a dosing unit 5 for injecting a specified dose into a carrier gas stream 6. Examples of a gas as carrier gas for gas chromatograph include nitrogen, hydrogen and helium. The carrier gas 6 transports the sample through one or several separation columns 7 where separation of the components of the sample 4 takes place. The gas components successively eluting from the column 7 are detected and quantitatively identified by a detector 8.

The carrier gas 6 is taken from a gas source 9, here a gas bottle. The fluid pressure control apparatus 1 maintains the pressure of the carrier gas 6 delivered to the gas chromatograph 3 at a predetermined level to provide an optimum performance over the operating target ranges. The pressure control apparatus 1 includes a proportional solenoid valve 10 that has a solenoid portion 11 and a valve portion 12. The valve portion 12 is operatively connected between a fluid inlet port 13 to which the gas source 9 is connected and a fluid outlet port 14 to which the dosing unit 5 of the gas chromatograph 3 is connected. The fluid inlet port 13 is in fluid communication with an additional fluid port 15 which allows connecting the fluid inlet port of a second fluid pressure control apparatus (not shown) to the gas source 9. A differential pressure sensor 16 measures the pressure of the carrier gas 6 at the fluid outlet port 14 against the atmospheric pressure. To that end, the pressure sensor 16 is fluidically coupled to the fluid outlet port 14 on one side and on the other side via an atmosphere inlet port 17 to the surrounding atmosphere. A reference pressure inlet port 18 allows alternatively connecting the pressure sensor 16 to a reference pressure source (not shown). Any of the ports, e.g. fluid port 15 or reference pressure inlet port 18, which is not used, is closed.

The pressure control apparatus 1 further includes an electronic controller 19 which is powered via a line 20 and which generates and outputs a control signal 21 to the proportional solenoid valve 10 in dependence on a control deviation between a first signal 22 provided by the pressure sensor 16 and representative of the measured or sensed pressure and a pressure set point value 23.

The solenoid valve 10 and the electronic controller 19 are arranged inside the enclosure 2. As the gas chromatograph 3 may be located in a hazardous area where explosive gas or dust might be present, the enclosure 2 is designed explosion-proof or may be purged with air or an inert gas to prevent flammable gases from entering the enclosure and/or to dilute and disperse such gases as to render the gas mixture in the enclosure 2 non-explosive.

The ports 13, 14, 15, 17, 18 are realized as tube fittings on a front side 24 of a manifold block 25 that closes an opening 26 of the enclosure 2 to which it is mounted. The manifold block 25 further comprises fluid connectors 27, 28 on a backside 29 facing the inner of the enclosure 2 and internal passageways 30 which connect the fluid connector 27 to the fluid inlet port 13, the fluid connector 28 to the fluid outlet port 14 and further connect the differential pressure sensor 16 between the fluid outlet port 14 and the atmosphere and/or reference pressure inlet port 17, 18. While the pressure sensor 16 is accommodated inside the manifold block 25 and separated from the inner of the enclosure 2, the valve portion 12 of the solenoid valve 10 is arranged inside the enclosure 2 and permanently joined to the backside 29 of the manifold block 25, where the fluid connectors 27, 28 provide fluid passageways between the valve portion 12 and the manifold block 25. The joint is infallible and can be made by, e.g., welding or clamping.

The first signal 22 provided by the pressure sensor 16 is conducted to the electronic controller 19 in the enclosure 2 via a fluid-tight electrical feedthrough 31 in the manifold block 25.

Figure 2:
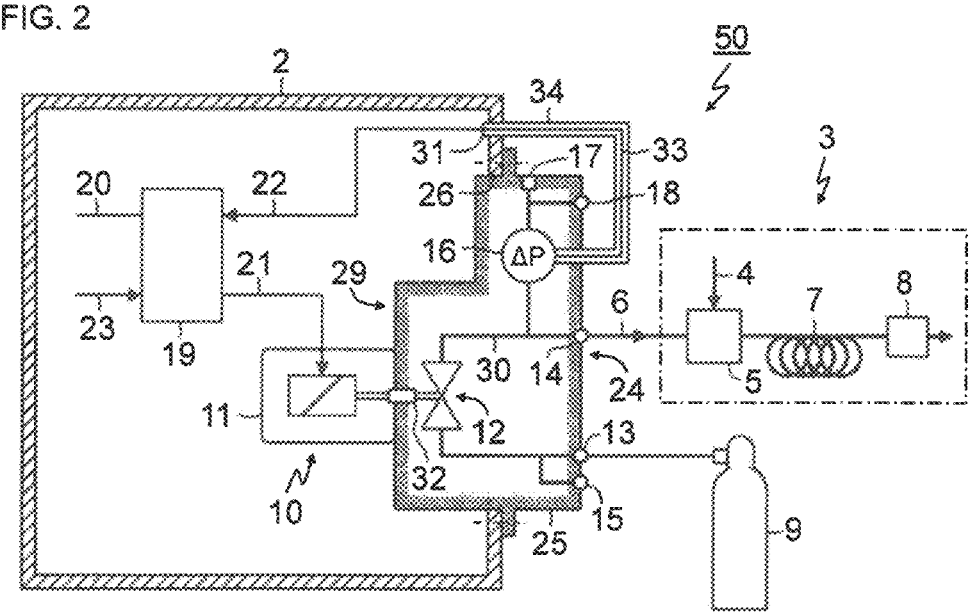
FIG. 2 illustrates a simplified schematic block diagram of a second exemplary embodiment of a fluid pressure control apparatus according to the invention.

FIG. 2 illustrates a simplified schematic block diagram of a second exemplary embodiment of a fluid pressure control apparatus according to the invention, generally designated by reference numeral 50. Parts corresponding with those in FIG. 1 are denoted by identical reference numerals and not explained again. The description below will center on the differences between the embodiments. In this embodiment, the valve portion 12 of the solenoid valve 10 is accommodated in the manifold block 25 and separated from the inner of the enclosure 2. The manifold block 25 comprises, at the backside 29, an operational interface 32 in the form of a positioning element between the valve portion 12 and the solenoid portion 11 of the solenoid valve 10.

Alternatively, the operational interface 32 may comprise a magnetic coupling, e.g., between a coil of solenoid portion 11 and a plunger of the valve portion 12.

The fluid-tight electrical feedthrough 31 is arranged in the wall of the enclosure 2. The cable 33 carrying the first signal 22 through the area outside the enclosure 2 is surrounded by an enclosure 34 that provides a certain ingress protection level.

Figure 3:
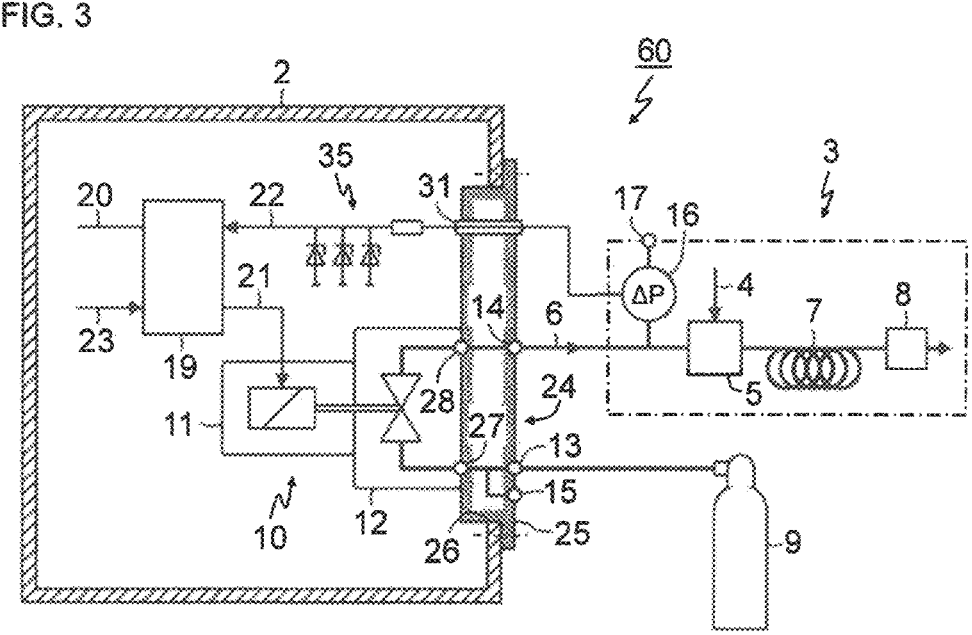
FIG. 3 illustrates a simplified schematic block diagram of a third exemplary embodiment of a fluid pressure control apparatus according to the invention.

FIG. 3 illustrates a simplified schematic block diagram of a third embodiment of a fluid pressure control apparatus 1 according to the invention, generally designated by reference numeral 60. Parts corresponding with those in FIGS. 1 and 2 are denoted by identical reference numerals and not explained again. The description below will center on the differences between the embodiments. In this embodiment, the pressure sensor 16 is arranged outside both the enclosure 2 and the manifold block 25. The pressure sensor 16 is connected to the electronic controller 19 through an intrinsic safety barrier 35 inside the enclosure 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein;

What is claimed is:

1. A fluid pressure control apparatus, comprising:
   a proportional solenoid valve including a solenoid portion and a valve portion which is operatively connected between a fluid inlet port and a fluid outlet port;
   a pressure sensor fluidically coupled to the fluid outlet port;
   an electronic controller configured to receive a first signal from the pressure sensor, to receive a second signal corresponding to a pressure set point, and to generate and output a control signal to the solenoid valve;
   a flameproof or explosion proof or pressurized or purged first enclosure which houses the electronic controller and at least the solenoid portion of the proportional solenoid valve, said first enclosure having an opening; and a manifold block mounted to the first enclosure so as to cover and close the opening of the first enclosure, said manifold block having a front side which faces outside the first enclosure and includes the fluid inlet port and the fluid outlet port, said manifold block including internal passageways connecting the valve portion of the solenoid valve between the fluid inlet port and the fluid outlet port, wherein the pressure sensor is arranged outside the first enclosure, with the first signal from the pressure sensor being conducted into the first enclosure via a fluid-tight electrical feedthrough.

2. The fluid pressure control apparatus of claim 1, wherein the pressure sensor is arranged outside the manifold block.

3. The fluid pressure control apparatus of claim 1, wherein the pressure sensor is accommodated in the manifold block.

4. The fluid pressure control apparatus of claim 1, wherein the gas-tight electrical feedthrough is arranged in the manifold block.

5. The fluid pressure control apparatus of claim 1, further comprising a second enclosure designed to provide protection against ingress and configured to guide therein a path of the first signal outside the first enclosure and the manifold block.

6. The fluid pressure control apparatus of claim 1, further comprising an intrinsic safety barrier accommodated inside the first enclosure, said pressure sensor being connected to the electronic controller through the intrinsic safety barrier.

7. The fluid pressure control apparatus of claim 1, wherein the manifold block has a backside facing inside the first enclosure, said valve portion of the solenoid valve being housed in the first enclosure and permanently joined to the backside of the manifold block.

8. The fluid pressure control apparatus of claim 1, wherein the manifold block has a backside facing inside the first enclosure, said valve portion of the solenoid valve being accommodated in the manifold block, and further comprising an operational interface disposed in the backside between the valve portion and the solenoid portion.

9. The fluid pressure control apparatus of claim 8, wherein the operational interface comprises a positioning element.

10. The fluid pressure control apparatus of claim 8, wherein the operational interface comprises a magnetic coupling.

11. The fluid pressure control apparatus of claim 1, wherein the manifold block is one-piece and integrally formed.

12. A gas chromatograph, comprising a fluid pressure control apparatus comprising a proportional solenoid valve including a solenoid portion and a valve portion which is operatively connected between a fluid inlet port and a fluid outlet port, a pressure sensor fluidically coupled to the fluid outlet port, an electronic controller configured to receive a first signal from the pressure sensor, to receive a second signal corresponding to a pressure set point, and to generate and output a control signal to the solenoid valve, flameproof or explosion proof of pressurized or purged first enclosure which houses the electronic controller and at least the solenoid portion of the proportional solenoid valve, said first enclosure having an opening, and a manifold block mounted to the first enclosure so as to cover and close the opening of the first enclosure, said manifold block having a front side which faces outside the first enclosure and includes the fluid inlet port and the fluid outlet port, said manifold block including internal passageways connecting the valve portion of the solenoid valve between the fluid inlet port and the fluid outlet port, wherein the pressure sensor is arranged outside the first enclosure, with the first signal from the pressure sensor being conducted into the first enclosure via a fluid-tight electrical feedthrough.

13. The gas chromatograph of claim 12, wherein the pressure sensor is arranged outside the manifold block.

14. The gas chromatograph of claim 12, wherein the pressure sensor is accommodated in the manifold block.

15. The gas chromatograph of claim 12, wherein the gas-tight electrical feedthrough is arranged in the manifold block.

16. The gas chromatograph of claim 12, wherein the fluid pressure control apparatus includes a second enclosure designed to provide protection against ingress and configured to guide therein a path of the first signal outside the first enclosure and the manifold block.

17. The gas chromatograph of claim 12, wherein the fluid pressure control apparatus includes an intrinsic safety barrier accommodated inside the enclosure, said pressure sensor being connected to the electronic controller through the intrinsic safety barrier.

18. The gas chromatograph of claim 12, wherein the manifold block has a backside facing inside the first enclosure, said valve portion of the solenoid valve being housed in the first enclosure and permanently joined to the backside of the manifold block.

19. The gas chromatograph of claim 12, wherein the manifold block has a backside facing inside the first enclosure, said valve portion of the solenoid valve being accommodated in the manifold block, said fluid pressure control apparatus including an operational interface disposed in the backside between the valve portion and the solenoid portion.

20. The gas chromatograph of claim 12, wherein the manifold block is one-piece and integrally formed.

* * * * *